United States Patent
Kochan, Jr.

(10) Patent No.: US 10,458,134 B2
(45) Date of Patent: Oct. 29, 2019

(54) STRUCTURAL REPAIR AND REMOTE MONITORING SYSTEM AND METHOD

(71) Applicant: Emecole Metro, LLC, Romeoville, IL (US)

(72) Inventor: John R. Kochan, Jr., Naperville, IL (US)

(73) Assignee: EMECOLE METRO, LLC, Romeoville, IL (US)

( * ) Notice: Subject to any disclaimer, the term of this patent is extended or adjusted under 35 U.S.C. 154(b) by 0 days.

(21) Appl. No.: 15/922,496

(22) Filed: Mar. 15, 2018

(65) Prior Publication Data

US 2018/0266128 A1    Sep. 20, 2018

Related U.S. Application Data

(60) Provisional application No. 62/471,731, filed on Mar. 15, 2017.

(51) Int. Cl.
*G01M 5/00* (2006.01)
*E04G 23/02* (2006.01)
*E04B 1/06* (2006.01)
*G05B 23/02* (2006.01)

(52) U.S. Cl.
CPC ............ *E04G 23/0229* (2013.01); *E04B 1/06* (2013.01); *G01M 5/0033* (2013.01); *G01M 5/0066* (2013.01); *G05B 23/0213* (2013.01); *G05B 23/0283* (2013.01)

(58) Field of Classification Search
CPC .... G01M 5/00; G01M 5/0033; G01M 5/0066; G01M 5/008; G01M 5/0016; G01M 5/0041; G01M 5/0058; E04G 23/0229; E04B 1/06; E01C 7/00; E01C 7/14; E01C 11/02; E01C 11/04; H01L 41/047
USPC .................................................. 73/786, 632
See application file for complete search history.

(56) References Cited

U.S. PATENT DOCUMENTS

| | | | | |
|---|---|---|---|---|
| 5,553,504 A * | 9/1996 | Lyons | ...................... | G01B 5/30 73/766 |
| 6,694,690 B2 * | 2/2004 | Li | ........................... | E01C 7/147 52/396.02 |
| 7,286,964 B2 * | 10/2007 | Kim | ....................... | G01H 9/004 340/870.15 |
| 7,367,236 B2 * | 5/2008 | Georgeson | .......... | G01M 5/0016 73/12.09 |
| 7,398,698 B2 * | 7/2008 | Griess | ................. | G01M 5/0033 702/36 |

(Continued)

*Primary Examiner* — Lisa M Caputo
*Assistant Examiner* — Octavia Hollington
(74) *Attorney, Agent, or Firm* — George S. Pavlik; Husch Blackwell LLP

(57) ABSTRACT

A system is provided for being affixed to a portion of a construction structure that has sustained a fracture. The system can provide a repair strap, sensor and communication interface. The repair strap can be securable to the structure to span at least a portion of the fracture. The sensor can be carried on the repair strap and be configured to detect at least one condition representative of additional fracture of the structure. An electrical signal can be generated in response to said detection. The communication interface can be electrically coupled to the sensor and can receive the electrical signal generated by the sensor. The communication interface can be configured to transmit information to a remote electronic device via a public or private communication network.

17 Claims, 4 Drawing Sheets

(56) References Cited

U.S. PATENT DOCUMENTS

| | | | | |
|---|---|---|---|---|
| 9,038,458 B2 * | 5/2015 | Becker | .................... | B29C 73/10 |
| | | | | 73/432.1 |
| 9,239,315 B1 * | 1/2016 | Georgeson | ............. | G01N 29/04 |
| 9,457,553 B2 * | 10/2016 | Stehmeiner | ............. | B32B 41/00 |
| 2002/0020224 A1 * | 2/2002 | Sato | ....................... | G01B 11/18 |
| | | | | 73/803 |

\* cited by examiner

STRUCTURAL REPAIR AND REMOTE MONITORING SYSTEM AND METHOD

CROSS-REFERENCE TO RELATED APPLICATION

This application claims priority to and the benefit of U.S. Provisional Patent Application Ser. No. 62/471,731 filed Mar. 15, 2017, the entirety of which is hereby incorporated by reference as if fully set forth herein.

FIELD

The present invention relates to an improved system for repairing or containing structural defects present in building structures such as, for example, foundation walls constructed of concrete. The present invention also relates to systems and methods to remotely monitor the repaired structural defect for the occurrence of stresses, strains, settling or other signs that indicate further deterioration of the original structure and/or the repair site. Embodiments can also include a permanent component for remote monitoring of stresses in the repair system.

BACKGROUND

Concrete walls or structures can over time experience settling and/or develop structural defects such as cracks and/or fractures. Such cracks can have functional consequences, such as allowing the movement of air or water through the structure, manifesting as drafts or leaks. Further, if unchecked, a small crack can develop into a larger crack and impair the integrity of the structure, causing the structure to buckle, bow or crumble. Such phenomena can over time result in the total structural failure of a structure or system, whether a wall, foundation, building support or some other kind of infrastructure assembly such as a bridge, tunnel or dam.

When concrete walls develop cracks, a common repair solution is to cover the crack with a sheet and bond the sheet into place much like placing a bandage over a wound. A commonly used solution uses a carbon fiber strap or a carbon fiber sheet which can be placed over the crack in the wall, fastened into place by any number of means. Such carbon fiber strap can be fastened to the crack and/or an intact portion of wall around the crack with epoxy. The carbon fiber strap can also be fastened into place around the crack through the use of solid fasteners such as carbon fiber staples, tacks or nails. Like a bandage, this bonded covering sheet contains the crack and minimizes further erosion and enlargement of the crack or fracture.

In this way, further deterioration of the structure can be minimized and the inflow or outflow of gases, liquids, solids, and pests through the crack is also minimized. However, like a bandage, this repair process can occasionally provide only a temporary or short-term solution. In particular, since many concrete structures are continuously subjected to stresses and/or settling, whenever a concrete structure is repaired with a remedial structural patch, cover or sealant, it is likely that the repaired structure will continue to be subjected to additional stress and can have a tendency to move/shift again. Such shifts, cracks or settlement of a repaired structure can further dislodge the cover material (e.g. carbon fiber mesh) and/or fasteners which can accelerate deterioration and loss of integrity. Similarly, pieces of solidified epoxy may create stresses on the wall or structure when subjected to similar settling forces.

In view of the continuous nature of the external forces acting on a repaired system, further deterioration and/or other conditions leading to structural failure can go undetected unless the repaired structure is continuously monitored in person and/or subjected to regular visual inspections. Since such monitoring and inspection services can be time consuming and expensive, there is a need in the art for a system and method having the capability to automatically monitor a repaired structure for defects such as settling or cracking and to provide notifications or alerts of such conditions to remote locations to enable authorized persons to conduct further inspections and/or take remedial actions. It will be recognized and understood that such systems and methods (as provided according to exemplary embodiments presented herein) can prevent and better avoid catastrophic events/damage before it occurs and additionally provide peace of mind to property owners and the public.

DETAILED DESCRIPTION

Figure 1A:
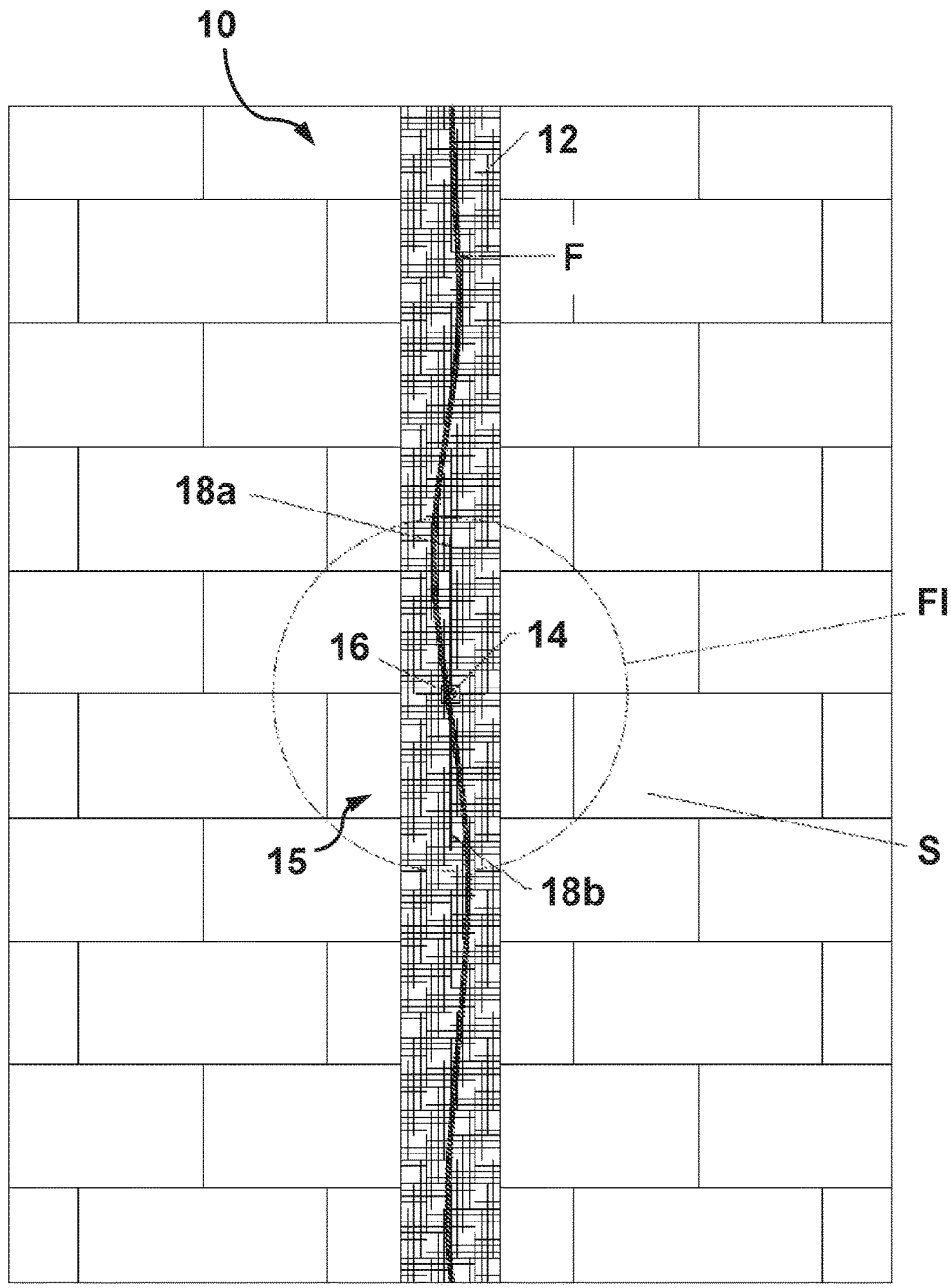
FIG. 1A is a schematic front elevation view of a physical structure shown with a repair system and monitoring device according to embodiments presented herein.

While the subject invention is susceptible of embodiment in many different forms, there are shown in the drawings, and will be described herein in specific detail, embodiments thereof with the understanding that the present disclosure is to be considered as an exemplification of the principles of the invention as well as the best mode of practicing same and is not intended to limit the invention or claims to the specific embodiments illustrated.

With reference now to the figures, FIGS. 1A-1B and FIGS. 2A-2B representatively illustrate a portion of a physical construction structure S such as a building or foundation wall, support, roof truss, or portion of an infrastructure system (e.g. tunnel, bridge, dam, etc.). Structure S can additionally be representative of portions, surfaces or structures provided in stadiums, areas or other building structures which are made of concrete or other critical support materials such as carbon fiber, steel, wood, etc.

As shown schematically in FIGS. 1A-1B and FIGS. 2A-2B, structure S is illustrated as being configured with a repair and monitoring system 10 according to exemplary embodiments. It will be understood that repair and monitoring system 10 can be used on walls and other structural components of a building or architectural structure. For example, system 10 can be applied to a wall or other structural member of a building, such as ceilings, floors, balconies, trusses and partitions without limitation. System 10 can also be used for other public infrastructure systems such as, for example, bridges, tunnels, dams or even other types of three dimensional artistic works such as statues, sculptures, and the like. Generally, it will be understood that system 10 can be applied to any structure that is susceptible to cracking, settling or separating, and further where there is concern that such conditions can compromise the structural integrity of the structure and/or result in structural failure.

As shown schematically in the figures, system 10 can include at least one substrate or repair strap 12 applied across or stretched over at least a portion of a crack, fissure or fracture F that has formed in the structure S. According to an exemplary embodiment, repair strap 12 can have opposing ends or sides that can be secured or affixed to the opposing sides of the fracture F to bind, join and/or seal the opposing sides of the fracture from separating further. Strap 12 can preferably be a sheet or strip of metal (e.g. sheet metal or aluminum) or fibrous fabric (e.g. carbon fiber or Kevlar® fabric), that is securable or can be affixed to the face of the structure S. Strap 12 can additionally be constructed of any other material having high tensile strength, high stiffness and low thermal expansion properties.

According to exemplary embodiments, system 10 can feature one larger-sized repair strap 12 spanning across various segments of the fracture F. Alternatively, plurality of repair straps 10 can also be used in a layered or overlapping arrangement to completely cover the fracture F. In addition, a plurality of separate repair straps 12 can be used at a plurality of discrete locations along the crack or defect. Where a plurality of repair straps 12 are used, the straps 12 can be made of the same materials of different materials. Repair strap 12 can form a single layer over the fracture F or a series of layers. It will be recognized that multiple overlapping layers can impart a variety of useful qualities to the repair covering, such as insulation, pest resistance, water absorbance, and the like.

According to exemplary embodiments as described below, repair strap 12 can include, or be fitted or embedded with, a sensor or strain gauge 14 or other device for measuring strains or stresses that the repair or structure S might experience and a communication device 16 such as, for example, a wireless data port/interface that can enable wireless communication between the system 10 and a remote electronic device via a public or private communication network.

Figure 1B:
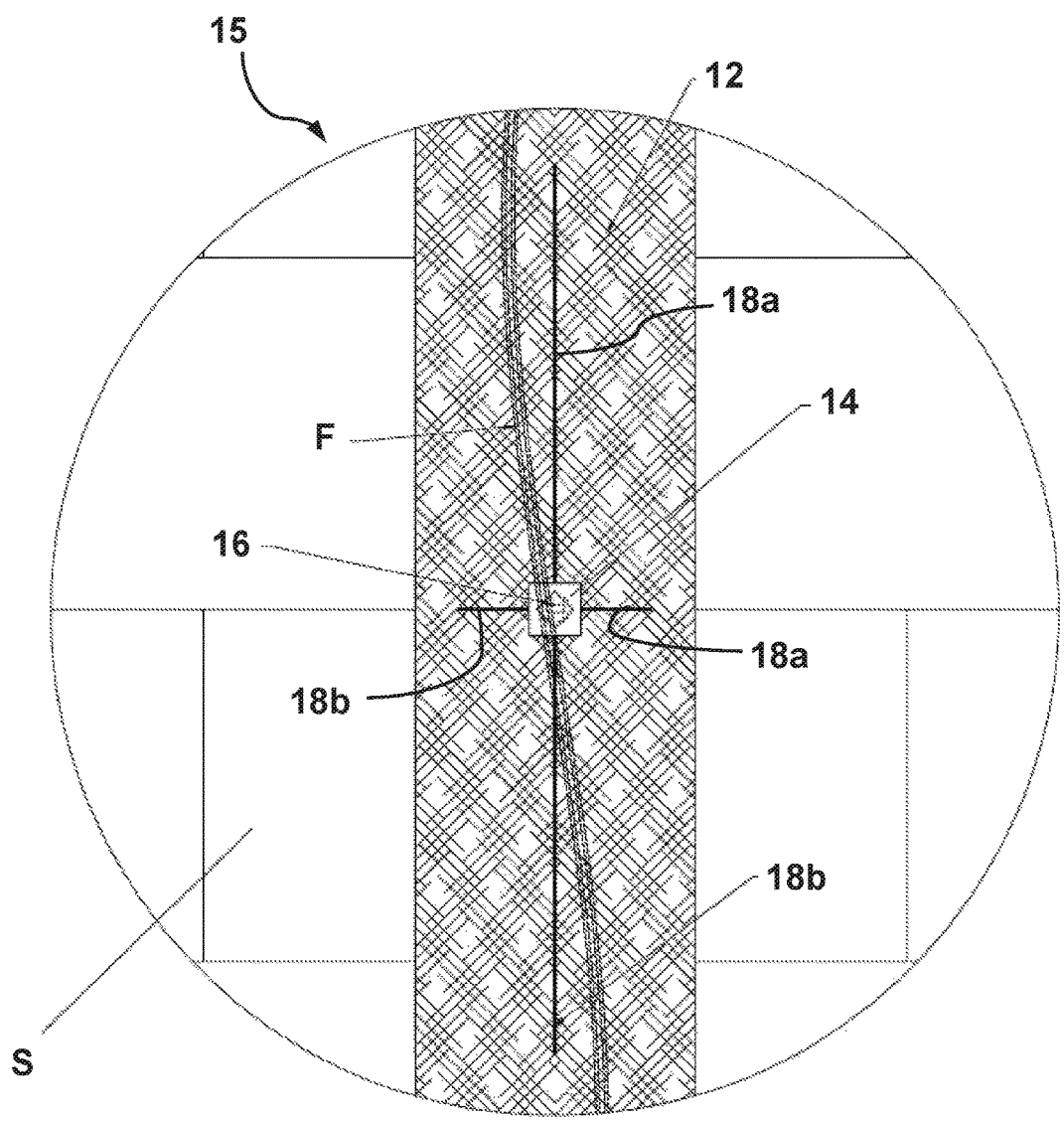
FIG. 1B is a schematic partial detail view of the repair system and monitoring device shown in FIG. 1A.

As shown schematically in FIGS. 1A and 1B, system 10 can employ a single repair strap 12 spanning lengthwise over a fracture F in structure S. As described above, repair strap 12 can be constructed of a metal or fiber material such as sheet metal or carbon fiber. As shown schematically in FIG. 1A, repair strap 12 can be secured to structure S lengthwise along fracture F such that one end of repair strap 12 is secured to one side of fracture F and a second opposing end of repair strap 12 is secured to the other side of fracture F. Although not shown in the figures, it will be understood that repair strap 12 can be secured to structure S by any number of means including, but not limited to, solid fasteners such as carbon fiber stapes, tacks, nails, screws or the like or by the application of bonding substances in liquid, semi-liquid or gel-form such as sealants, epoxies, polymers, semi-polymers, resins, concrete, grout or plaster which can harden and be cured into a solid state. Such materials can further be used to fill the fracture F.

As shown schematically in FIGS. 1A and 1B, system 10 can comprise at least one sensor 14. According to exemplary embodiments, sensor 14 can be at least partially carried on, secured or affixed to, or embedded or woven within at least a portion of repair strap 12 as shown schematically in FIGS. 1A and 1B. According to an exemplary embodiment, sensor or strain gauge 14 can be affixed or secured to repair strap 12 with an adhesive, epoxy, mechanical fastener, or other fastener or bonding adhesive. Sensor 14 can also include a support member, such as a solid backing or a tension wire to provide additional support and to orient the sensor in the appropriate position for intended operation.

Sensor 14 can be a strain gauge or any other type of sensor/detector device capable of detecting an applied force such as pressure, strain, tension, weight or vibration and converting such force into electrical resistance which is capable of being detected or measured. Although FIGS. 1A and 1B illustrate the system as having only one sensor 14 centrally located on repair strap 12, it will be recognized and understood that multiple sensors 14 can be provided at a plurality of locations relative fracture F with such plurality of sensors being used in connection with a single repair strap or on multiple separate repair straps as described below in connection with FIGS. 2A and 2B.

According to an exemplary embodiment, sensor 14 can be configured to detect an applied force comprising at least one of tension across the repair strap 12, strain across the repair strap 12, enlargement of the fracture F, vibration of the repair strap 12, vibration of the structure S, deformation of the repair strap 12, stretching of the repair strap 12 in a direction between its opposing first and second ends/sides and displacement of the repair strap 12 relative the structure S. Sensor can also be configured to measure and detect temperature, variations or temperature or thermal expansion/contraction of structure S. Such applied force, can vary the electrical resistance of sensor or strain gauge 14 which can be measured and registered as being indicative of further fracture, separation or damage to structure S.

As shown schematically in FIGS. 1A and 1B, sensor or strain gauge 14 can have a plurality of leads or feelers 18 including a first lead 18*a* that can extend along a portion of the structure S along one side of the fracture F and a second lead 18*b* that can extend along a portion of the structure S along a second opposite side of the fracture F. It will be recognized that the occurrence or onset of an applied force of the type identified above can be detected by leads 18, including causing the leads to deform or stretch. Detection of such force can change the electrical resistance of detector 14 and generate an electrical signal.

According to the exemplary embodiment illustrated in FIGS. 1A and 1B, system 10 is shown as including a communication interface 16. Communication interface 16 can be a wired or wireless data port electrically coupled to sensor 14 (or multiple sensors as required). Communication interface 16 can be provided with inputs for receiving electrical signals generated by sensor 14 (or from a displaced location) and outputs for transmitting signals, data and communications to other remote electronic devices (or sensors 14) through wired or wireless transmission via a public or private communication network such as the internet. Communication interface 16 can further be provided with a smart device (not shown) including a programmable processor, control circuitry and an electronic transitory or non-transitory storage medium for registering signals, commands or information detected by system 10 or received from a remote electronic device at a location displaced from system 10.

According to exemplary embodiments, signals, data and communications transmitted by communication interface 16 can be sent to remote electronic devices such as, for example, computers, servers, mobile personal electronic devices, smart phones, computer tablets and intelligent personal input/output devices (e.g. Amazon's Alexa) to name a few. Information transmitted by communication interface 16 can be stored and viewed locally on such remote electronic devices and/or can be saved to a server or database for access via remote electronic devices (i.e. the cloud computing paradigm). Communication interface 16 can additionally be configured for two-way communication with such remote electronic devices whereby signals sent by a remote electronic device can be received and registered by the communication interface 16.

Together, repair strap 12, sensor 14 and communication interface 16 according to exemplary embodiments can comprise an integrated monitoring unit 15 for detecting and registering the application of force to structure S, fracture F and/or repair strap 12. For example, where sensor 14 detects and registers a force causing vibration or deformation of structure S or repair strap 12, sensor 14 can generate and transmit an electrical signal to communication interface 16. Communication interface 16 can generate and transmit a communication signal (including, for example, a signal representative of an alert with further measurement data relative the force measured by the sensor) to a remote electronic device. The communication signal received by the remote electronic device can be registered by the device and displayed to a user on a graphical user interface. From the foregoing, it will be recognized and understood by persons having ordinary skill in the art that embodiments presented herein can enable a user at a remote location displaced from the structure 10 to remotely monitor the system 10 and structure S for stresses or damage that can compromise the integrity of the structure S and result in failure.

Figure 2A:
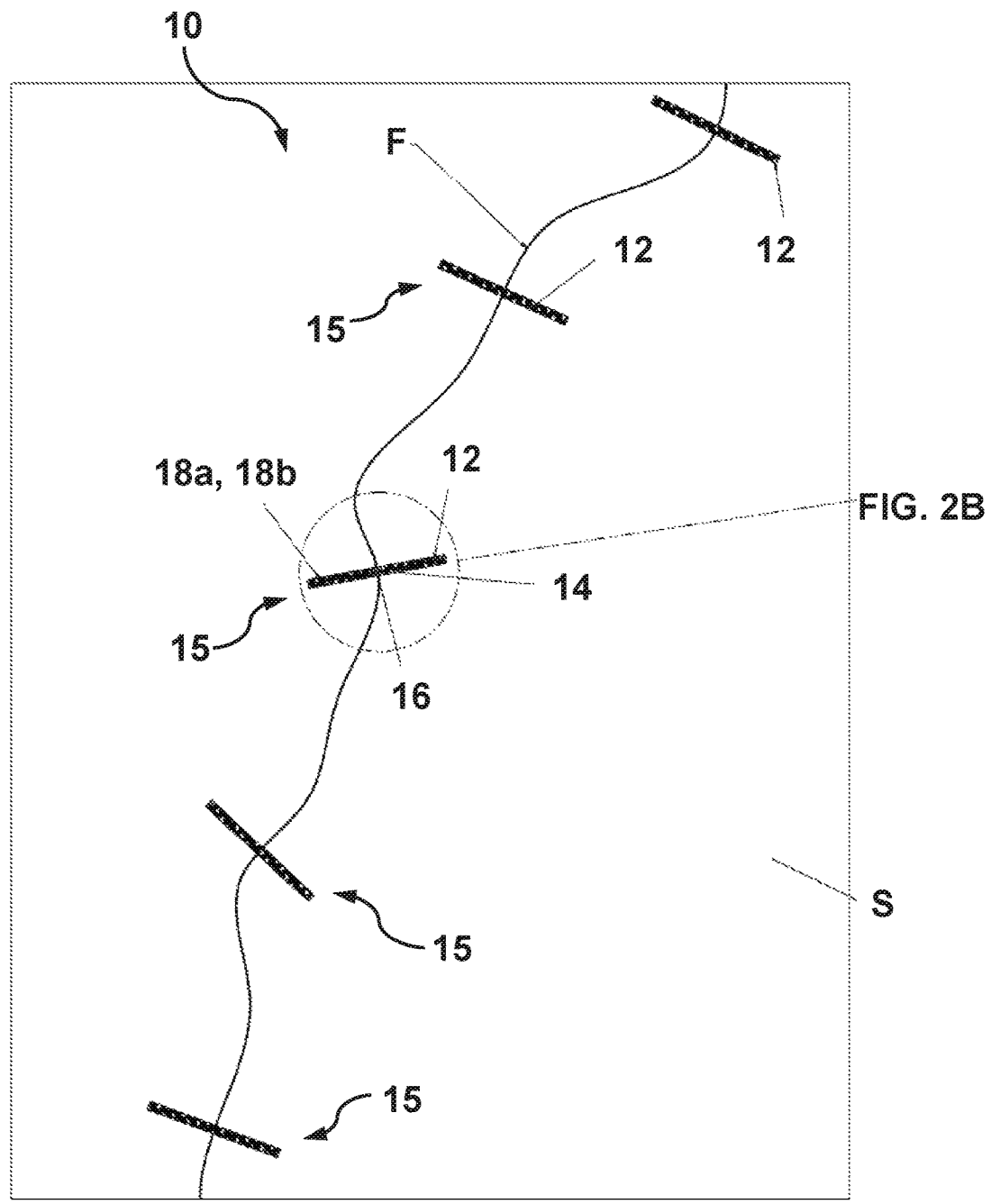
FIG. 2A is a schematic front elevation view of a physical structure shown with a repair system and monitoring device according to embodiments presented herein.
Figure 2B:
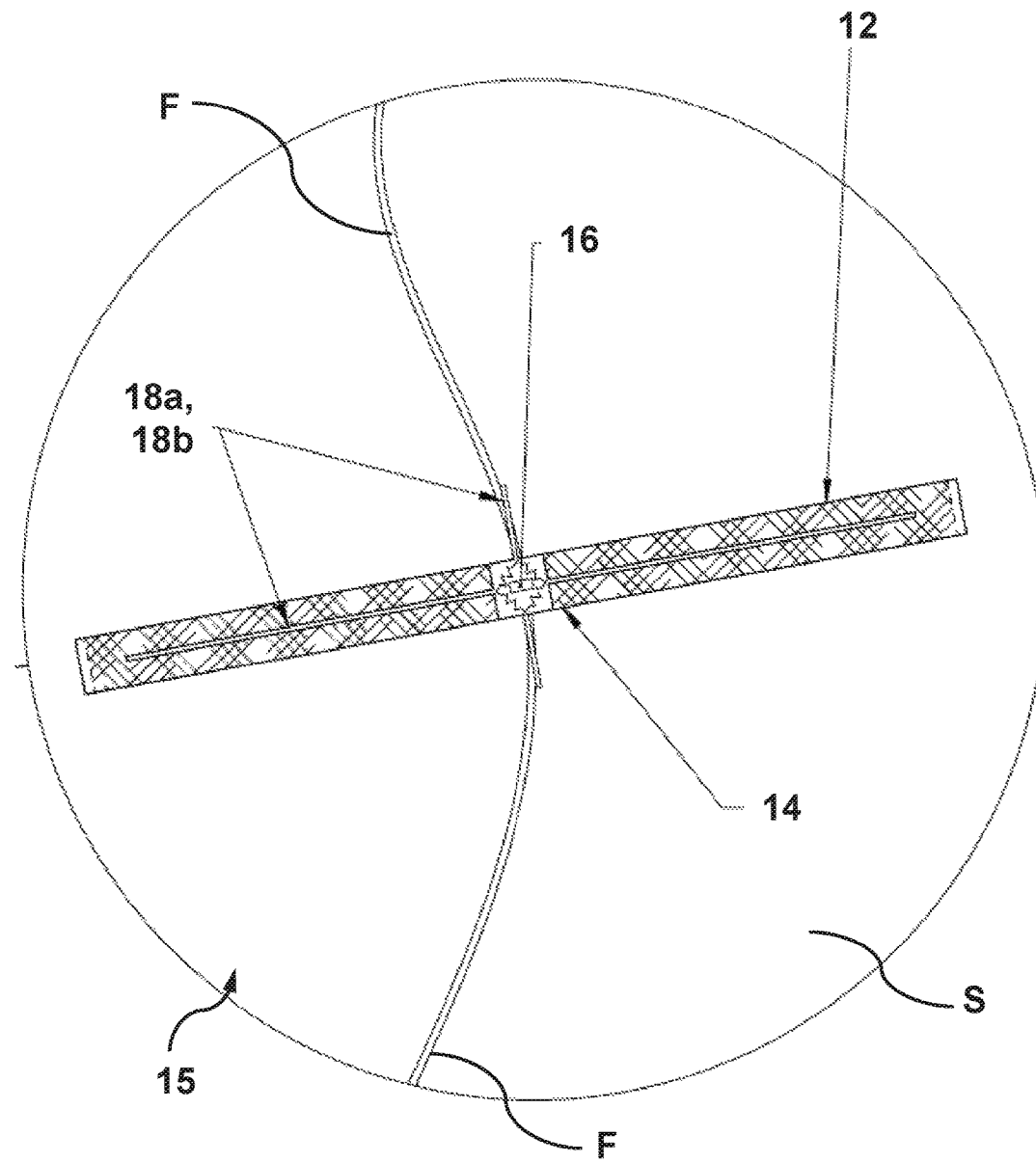
FIG. 2B is a schematic partial detail view of the repair system and monitoring device shown in FIG. 2A.

As illustrated schematically in FIGS. 2A and 2B, system 10 is shown as including a plurality of individual or discrete monitoring devices 15 of the type described above in connection with single monitoring device 15 shown in FIGS. 1A and 1B. In particular, the plurality of monitoring devices 15 shown in FIGS. 2A and 2B can individually include a repair strap 12, sensor 14 such as a strain gauge (with leads/feelers 18) and a communication interface 16 such as a data port. As shown in FIGS. 2A and 2B, monitoring devices 15 can be secured to structure S at a plurality of locations relative fracture F. Although not shown in FIGS. 2A and 2B, system 10 can alternatively feature a shared communication interface 16 electrically coupled to a plurality sensors 14 as opposed (or in addition to) communication interfaces 16 on each individual monitoring unit 15.

According to the exemplary embodiments illustrated in FIGS. 1A-1B and 2A-2B, a method of monitoring a construction structure for fracture or damage is provided. According to such embodiments, a fracture F in structure S can be filled or repaired with one, or multiple, repair straps 12 can being affixed or secured to the surface of structure and oriented in a manner that the one or more repair strap(s) span across the fracture F. One or more sensors 14 can be affixed or secured ton the repair straps 12 with the sensors being electrically coupled to a communication interface 16. The sensor(s) 14 can be calibrated (i.e., zeroed out to provide a starting point as reference for future measurements/detections).

Upon the application of force or vibration (and/or a temperature deviation from a predetermined range) to the structure S or repair strap(s) 12, sensor(s) 14 can detect such condition, including expansion, stretching, movement, strain, tension, deformation or displacement of the sensor 14, the fracture F and/or structure S and generate an electrical signal corresponding to (or representative of) a measurement of the degree of such detected condition. The electrical signal generated by the sensor(s) 14 can be transmitted to a communication interface 16, including, for example, a wireless data port. Communication interface 16 can transmit a message, alert, signal and/or other information through wired and/or wireless media via a public or private computer network.

Information transmitted by communication interface 16 can be received, accessed, displayed by a remote electronic device located in a location displaced from the system 10 and structure S to provide remote monitoring capability. In this regard, persons or service personnel can receive notifications/alerts in real time (or near real-time) of a detected force or damage incurred on system 10 and structure S. Such notifications/alerts and other measurement information detected by sensor(s) 14 can enable users/personnel to understand the occurrence of a damaging event and the extent or potential extent of such damage without being present at the structure S. Thus, embodiments disclosed herein, enable a user to evaluate damage caused to the structure S and take remedial measures to avoid the potential for catastrophic structural failure (including, for example, a first-hand visual inspection and emergency repairs).

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

What is claimed is:

1. A system for being affixed to a portion of a construction structure that has sustained a fracture comprising:

a repair strap having opposing first and second ends, the repair strap being securable to the structure to span at least a portion of the fracture with the first end of the repair strap being securable to a first portion of the structure adjacent one side of the fracture and the second end of the repair strap being securable to a second portion of the structure adjacent a second side of the fracture opposite the first side;

a sensor carried on the repair strap, the sensor configured to detect physical deformation in at least one of the repair strap or the structure, the deformation being occasioned by at least one of tension across the repair strap, strain across the repair strap, enlargement of the fracture, separation of the first and second sides of the fracture, strain of a conductor of the sensor brought on by vibration of the repair strap or vibration of the structure, stretching of the repair strap in a direction between the opposing first and second ends and displacement of the repair strap relative the structure, an electrical signal being generated in response to said detection;

a plurality of deformable leads coupled to the sensor, the plurality of leads including a first lead extendable along the first end of the repair strap adjacent the first portion of the structure and a second lead extendable along the second portion of the repair strap adjacent the second portion of the structure, the plurality of leads being deformable by physical deformation of at least one of the repair strap or the structure, the electrical signal being generated in response to deformation of one of the plurality of leads;

a communication interface electrically coupled to the sensor, the electrical signal generated by the sensor being receivable by the communication interface, the communication interface configured to transmit signals to a remote electronic device via a public or private communication network.

2. The system of claim 1 wherein the sensor is a strain gauge.

3. The system of claim 1 wherein the repair strap is comprised of a fabric material including at least one of carbon fiber or Kevlar®.

4. The system of claim 1 wherein the repair strap is comprised of sheet metal.

5. The system of claim 1 wherein the communication interface is a wireless communication interface for wireless communication with the remote electronic device.

6. The system of claim 1 where the communication interface is carried on the repair strap.

7. The system of claim 1 where the repair strap, sensor and wireless communication interface comprise a single integrated monitoring unit, the system further comprising a plurality of integrated monitoring units at a plurality of locations along structure including at least one location spanning the fracture or at least one location adjacent the fracture.

8. The system of claim 1 where the wireless communication interface is configured for two-way communication with a remote electronic device, signals sent by the remote electronic device being receivable by the wireless communication interface.

9. A system for being affixed to a portion of a construction structure that has sustained a fracture comprising:
   a plurality of monitoring units, each of the plurality of monitoring unit comprising:
   a repair strap having opposing first and second ends, the repair strap being securable to the structure to span at least a portion of the fracture with the first end of the repair strap being securable to a first portion of the structure adjacent one side of the fracture and the second end of the repair strap being securable to a second portion of the structure adjacent a second side of the fracture opposite the first side;
   a sensor carried on the repair strap, the sensor configured to detect physical deformation in at least one of the repair strap or the structure, the deformation being occasioned by at least one of tension across the repair strap, strain across the repair strap, enlargement of the fracture, separation of the first and second sides of the fracture, strain of a conductor of the sensor brought on by vibration of the repair strap or vibration of the structure, stretching of the repair strap in a direction between the opposing first and second ends and displacement of the repair strap relative the structure, an electrical signal being generated in response to said detection,
   a plurality of deformable leads coupled to the sensor, the plurality of leads including a first lead extendable along the first end of the repair strap adjacent the first portion of the structure and a second lead extendable along the second portion of the repair strap adjacent the second portion of the structure, the plurality of leads being deformable by physical deformation of at least one of the repair strap or the structure, the electrical signal being generated in response to deformation of one of the plurality of leads; and
   a wireless communication interface electrically coupled to the sensor of at least some of the plurality of monitoring units, the electrical signal generated by the sensor of one of the plurality of monitoring units being receivable by the communication interface, the wireless communication interface configured to transmit wireless signals to a remote electronic device via a public or private communication network.

10. The system of claim 9 wherein the sensor of at least one of the plurality of monitoring units is a strain gauge.

11. The system of claim 9 wherein the repair strap of at least one of the plurality of monitoring units is comprised of a fabric material including at least one of carbon fiber or Kevlar®.

12. The system of claim 9 wherein the repair strap of at least one of the plurality of monitoring units is comprised of sheet metal.

13. The system of claim 9 wherein the wireless communication interface is carried on the repair strap of at least one of the plurality of monitoring units.

14. The system of claim 9 further comprising a plurality of wireless communication interfaces, wherein each of the plurality of monitoring units has a separate one of the plurality of wireless communication interfaces.

15. The system of claim 9 where the wireless communication interface is configured for two-way communication with a remote electronic device, signals sent by the remote electronic device being receivable by the wireless communication interface.

16. A method of monitoring a construction structure for fracture comprising:
   affixing a repair strap to at least a portion of the structure sustaining a fracture, the repair strap having opposing first and second ends spanning the fracture;
   affixing a sensor to the repair strap, the sensor having a plurality of deformable leads coupled thereto, the plurality of leads including a first lead extendable along the first end of the repair strap and a second lead extendable along the second end of the repair strap, the plurality of leads being deformable by physical deformation of at least one of the repair strap or the structure, the electrical signal being generated in response to deformation of one of the plurality of leads;
   coupling the sensor to a communication interface;
   detecting at the sensor physical deformation in at least one of the repair strap or the structure, the deformation resulting from at least one of the application of tension across the repair strap, strain across the repair strap, enlargement of the fracture, separation of the first and second sides of the fracture, strain on a conductor of the sensor caused by vibration of the repair strap or vibration of the structure, stretching of the repair strap in a direction between the opposing first and second ends and displacement of the repair strap relative the structure;
   generating an electrical signal at the sensor in response to said detection;
   transmitting the electrical signal from the sensor to the wireless communication interface, and
   transmitting a communication signal from the communication interface to a remote electronic device, the communication signal being representative of an alert associated with said detection.

17. The method of claim 16 wherein the communication interface is a wireless communication interface and transmitting a communication signal comprises transmitting a wireless communication signal.

* * * * *